(12) United States Patent
Mao et al.

(10) Patent No.: US 11,790,894 B2
(45) Date of Patent: Oct. 17, 2023

(54) MACHINE LEARNING BASED MODELS FOR AUTOMATIC CONVERSATIONS IN ONLINE SYSTEMS

(71) Applicant: salesforce.com, inc., San Francisco, CA (US)

(72) Inventors: Yixin Mao, San Francisco, CA (US); Zachary Alexander, Berkeley, CA (US); Victor Winslow Yee, Berkeley, CA (US); Joseph R. Zeimen, San Francisco, CA (US); Na Cheng, Bellevue, WA (US); Chien-Sheng Wu, Mountain View, CA (US); Wenhao Liu, Redwood City, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 220 days.

(21) Appl. No.: 17/202,077

(22) Filed: Mar. 15, 2021

(65) Prior Publication Data
US 2022/0293094 A1   Sep. 15, 2022

(51) Int. Cl.
*G10L 15/16* (2006.01)
*H04L 51/02* (2022.01)
(Continued)

(52) U.S. Cl.
CPC ............ *G10L 15/16* (2013.01); *G10L 15/063* (2013.01); *G10L 15/08* (2013.01); *G10L 15/22* (2013.01);
(Continued)

(58) Field of Classification Search
CPC ............................ G06F 40/56; G06F 16/3344
See application file for complete search history.

(56) References Cited

U.S. PATENT DOCUMENTS

| 2007/0022109 A1* | 1/2007 | Imielinski ........... G06F 16/3329 |
| 2014/0257805 A1* | 9/2014 | Huang .................. G10L 15/063 |
| | | 704/232 |

(Continued)

FOREIGN PATENT DOCUMENTS

CN          107220641 A  *  9/2017  ............. G06K 9/325

OTHER PUBLICATIONS

C, Liu, "Automatic Dialogue Summary Generation for Customer Service," KDD'19, 2019. (Year: 2019).*

(Continued)

*Primary Examiner* — Feng-Tzer Tzeng
(74) *Attorney, Agent, or Firm* — Fenwick & West LLP (57) ABSTRACT

A system uses conversation engines to process natural language requests and conduct automatic conversations with users. The system generates responses to users in an online conversation. The system ranks generated user responses for the online conversation. The system generates a context vector based on a sequence of utterances of the conversation and generates response vectors for generated user responses. The system ranks the user responses based on a comparison of the context vectors and user response vectors. The system uses a machine learning based model that uses a pretrained neural network that supports multiple languages. The system determines a context of an utterance based on utterances in the conversation. The system generates responses and ranks them based on the context. The ranked responses are used to respond to the user.

20 Claims, 7 Drawing Sheets

(51) Int. Cl.
  G10L 15/06  (2013.01)
  G10L 15/08  (2006.01)
  G10L 15/22  (2006.01)
  G06F 16/33  (2019.01)
  G06F 40/56  (2020.01)
(52) U.S. Cl.
  CPC .......... H04L 51/02 (2013.01); *G06F 16/3344* (2019.01); *G06F 40/56* (2020.01)

(56) References Cited

U.S. PATENT DOCUMENTS

2016/0350288 A1* 12/2016 Wick .................. G06F 40/44
2016/0352656 A1* 12/2016 Galley ................. H04L 51/02

OTHER PUBLICATIONS

Liu, et al., "Automatic Dialogue Summary Generation for Customer Service," KDD'19. (Year: 2019).*
Devlin, J. et al., "BERT: Pre-training of Deep Bidirectional Transformers for Language Understanding," arXiv:1810.04805v2, May 24, 2019, pp. 1-16.
Google, "TF2.0 Saved Model (v3)," last edited May 6, 2021, five pages, [Online] [Retrieved on May 10, 2021] Retrieved from the Internet <URL: https://tfhub.dev/google/universal-sentence-encoder-multilingual/3>.
Salvaggio, D., "Multilingual Universal Sentence Encoder (MUSE)," Sep. 2, 2019, 10 pages, [Online] [Retrieved on May 10, 2021] Retrieved from the Internet <URL: https://d-salvaggio.medium.com/multilingual-universal-sentence-encoder-muse-f8c9cd44f171>.
Vaswani, A. et al., "Attention Is All You Need," arXiv:1706.03762v5, Dec. 6, 2017, pp. 1-15.
Wikipedia, "Convolutional neural network," last edited May 5, 2021, 31 pages, [Online] [Retrieved on May 10, 2021] Retrieved from the Internet <URL: https://en.wikipedia.org/wiki/Convolutional_neural_network>.
Wikipedia, "Recurrent neural network," last edited May 6, 2021, 20 pages, [Online] [Retrieved on May 10, 2021] Retrieved from the Internet <URL: https://en.wikipedia.org/wiki/Recurrent_neural_network>.
Wikipedia, "Transformer (machine learning model)," last edited May 6, 2021, seven pages, [Online] [Retrieved on May 10, 2021] Retrieved from the Internet <URL: https://en.wikipedia.org/wiki/Transformer_(machine_learning_model)>.
Wu, C-S. et al., "TOD-BERT: Pre-trained Natural Language Understanding for Task-Oriented Dialogue," arXiv:2004.06871v3, Oct. 1, 2020, pp. 1-13.

* cited by examiner

MACHINE LEARNING BASED MODELS FOR AUTOMATIC CONVERSATIONS IN ONLINE SYSTEMS

BACKGROUND

Field of Art

This disclosure relates in general to automatic conversations using conversation engines, and in particular to machine learning based models to performing conversations in online systems.

Description of the Related Art

Online systems perform natural language interactions with users, for example, via conversation engines. For example, a conversation engine may allow a user to ask natural language questions to request for information or request the online system to perform certain actions. The conversation engine may also provide natural language responses to the user. A conversation engine may support text, speech, graphics, or other modes of interaction for input or output. Conversation engines are often used by multi-tenant systems that allow tenants of the multi-tenant systems to configure the conversation engine for specific purposes.

Machine learning techniques may be used for processing natural language utterances from users and for generating responses. These machine learning techniques require extensive training of models using historical data. In a multi-tenant system, each tenant may have to train the machine learning based model. Several tenants may not have sufficient training data for training the machine learning based model. If insufficient data is not available for training the machine learning based models, the accuracy of prediction of the machine learning based models is low, resulting in poor quality of automatic conversations using the conversation engines.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

DETAILED DESCRIPTION

Conversation engines allow online systems to process natural language requests and conduct conversations with users. The conversations may be fully automated or performed with the help of a human agent. For example, the conversation engine may provide a set of recommendations to agent who approves one of the responses. A conversation engine may also be referred to as a conversational agent, a dialog system, virtual assistant, or artificial intelligence (AI) assistant. The online system generates responses to users in an online conversation. The responses may be prepared in advance of an online conversation and accessed by the conversation engine. The online system ranks generated user responses for an online conversation. The response provided to the user is determined based on the ranked set of candidate responses.

The online system determines a context vector based on a sequence of utterances of the conversation. The online system accesses one or more candidate responses and determines response vectors for the candidate responses. The online system may prepare the response vectors in advance of an online conversation and access the response vectors during the conversation. The online system ranks the candidate responses based on a comparison of the context vectors and the response vectors.

The online system uses a machine learning based model that uses a pretrained neural network that supports multiple languages. The candidate responses as well as previous utterances in the conversation are converted to vectors using the pretrained language model. The pretrained multi-lingual model feeds into a multi-layered perceptron. The vectors representing utterances that form the context in the conversation are fed as input to a transformer encoder neural network to determine utterance vectors. The utterance vectors are combined to obtain a context vector. The candidate responses are ranked based on a measure of distance between the context vector and the candidate response vectors. The measure of distance used for two vectors may be a dot product of the two vectors.

In an embodiment, the online system is a multi-tenant system that performs custom configuration of tenant-specific conversation engines. A tenant refers to an entity, for example, an organization enterprise that is a customer of the multi-tenant system. The term tenant as used herein can refer to the set of users of the entire organization that is the customer of the multi-tenant system or to a subset of users of the organization. Accordingly, the tenant-specific conversation engine may be customized for a set of users, for example, the entire set of users of the organization, a specific group of users within the organization, or an individual user within the organization. The machine learning based model used by the conversation engine may be trained using training data that is specific to each tenant.

Conventional techniques for automatic ranking of responses for online conversations have certain drawbacks. For example, machine learning based models used for automatic r of responses are trained using data available in a specific language. As a result, these techniques lack support for performing conversations in multiple languages. Different machine learning based models have to be trained for different languages using training data based on conversations in each language. This requires significant computing and storage resources as well as manual effort. Furthermore, if a system lacks large amount of training data, the machine learning based model is poorly trained and has low accuracy. In a multi-tenant system, there can be several tenants that do not have the data and the resources to extensively train the machine learning based models. Accordingly, these tenants are unable to use the machine learning based model or achieve poor performance using the machine learning based model.

The disclosed embodiments overcome these shortcomings. The machine learning based model uses a pretrained multi-lingual model that has been trained by data that is not specific to a tenant or organization. Accordingly, specific organizations are able to leverage data and information that is publicly available. The organizations or tenants are able to train machine learning models with multi-lingual support without requiring training data for multiple languages. The tenants further fine-tune a machine learning model that was pretrained by further training the model using training data that is tenant specific.

Furthermore, the machine learning based models disclosed have higher accuracy compared to comparable conventional techniques. The system is able to achieve high accuracy using less training data as well as less computing resources for training the models. Therefore, the embodiments provide improvement over conventional techniques in terms of computational efficiency as well as resource usage and provide higher accuracy of prediction resulting in better automatic responses being ranked.

System Environment

Figure 1:
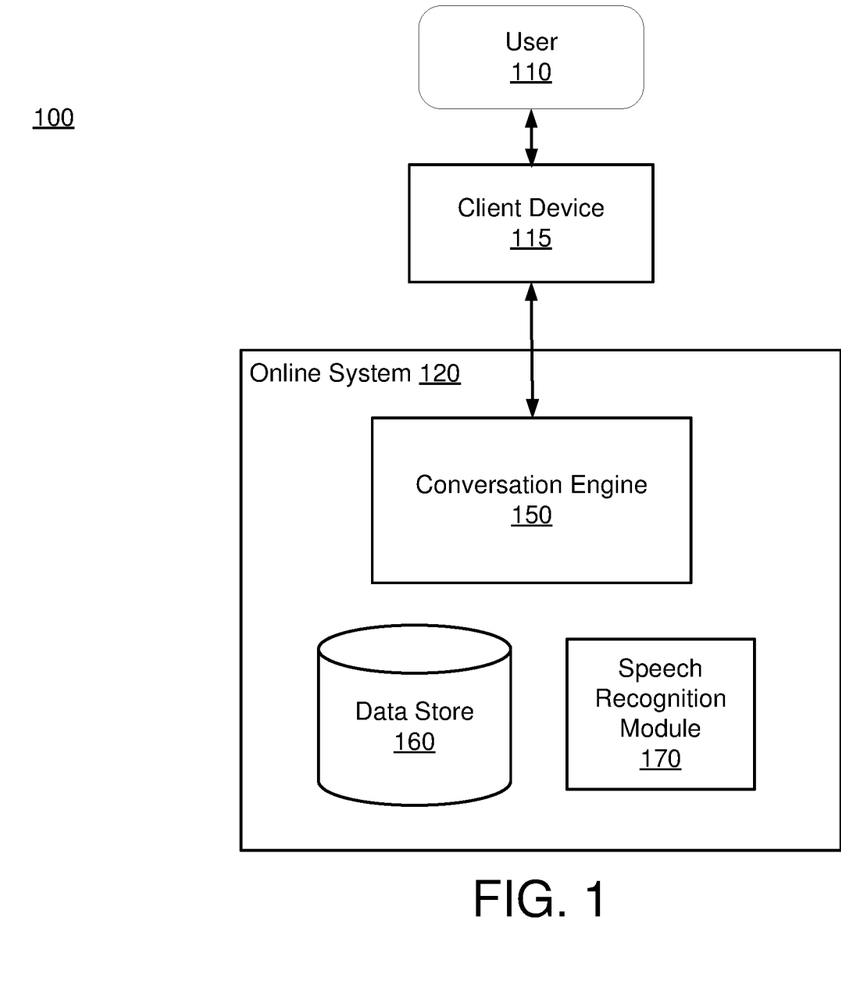
FIG. 1 is a block diagram of a system environment 100 for performing automatic conversations, according to one embodiment.

FIG. 1 is a block diagram of a system environment 100 for performing automatic conversations, according to one embodiment. The system environment 100 includes an online system 120 that communicates with users via client devices 115. The online system 120 includes a conversation engine 150, a data store 160, and a speech recognition module 170. The online system 120 may include other components not shown in FIG. 1, for example, various applications, other types of data stores, and so on. The system environment 100 may include other elements not shown in FIG. 1, for example, a network, a load balancer, and so on.

The conversation engine 150 performs automatic conversations with a user. The components of a conversation engine 150 are further described in detail herein, for example, in FIG. 2. The conversation engine 150 uses machine learning based models to evaluate candidate responses. The conversation engine 150 ranks responses using a machine learning based model to select the best response in a given context.

The context of a conversation is represented by a sequence of recent utterances that may have been provided by the user or recommended by the conversation engine or agent, and ranked by the online system 150. In an embodiment, an agent interacts with the online system to approve one of several candidate responses. The agent may be a user or an automatic process or software module. The online system 120 may determine multiple candidate responses for a given context and recommend them to the agent. The agent selects one of the recommended responses and provides to the user.

The online system 120 stores data in data store 160 that may be processed in order to respond to requests from users. For example, a permitted action may update data stored in data store 160, search for data stored in data store 160, and so on. The data store 160 stores data for users of the multi-tenant system. In an embodiment, the data store 160 stores information describing entities represented in the multi-tenant system. Each entity has an entity type. Each entity stores values in fields or data fields. Examples of entity types include account, case, opportunity, and so on. An entity representing an account stores information describing a user or an enterprise; an entity representing an opportunity represents a potential customer and stores fields representing information identifying the potential customer, a status of the opportunity, the last interaction with the potential customer; an entity representing a case stores information describing an interaction between an enterprise and a customer and stores fields comprising the date of the interaction, the type of the interaction, and other details of the interaction.

The data store 160 may be implemented as a relational database storing one or more tables. Each table contains one or more data categories logically arranged as columns or fields. Each row or record of a table contains an instance of data for each category defined by the fields. For example, a data store 160 may include a table that describes a customer with fields for basic contact information such as name, address, phone number, fax number, etc. Another table might describe a purchase order, including fields for information such as customer, product, sale price, date, etc.

The speech recognition module 170 receives audio signal as input and converts it into a computer readable format, for example, text for further processing. The speech recognition module 170 allows a user to use voice for conducting conversations with the online system 120. The output of the speech recognition module 170 is provided as input to other modules of the online system 120, for example, a machine learning module. Although the speech recognition module 170 allows conversations based on speech, the online system may perform conversations using other representations of utterances, for example, text, or video.

In some embodiments, the online system 120 is a multi-tenant system that stores data of multiple tenants. Each tenant may be an enterprise. For example, a tenant may be a company that employs sales people that use the multi-tenant system 120 to manage their sales processes. A multi-tenant system may store data for multiple tenants in the same physical database but enforce a logical separation of data across tenants. As a result, one tenant does not have access to another tenant's data, unless such data is expressly shared.

In an embodiment, online system 120 implements a web-based customer relationship management (CRM) system. For example, the multi-tenant system 120 may include application servers configured to implement and execute CRM software applications as well as provide related data, code, forms, webpages and other information to and from client devices 115 and to store to, and retrieve from, a database system related data, objects, and webpage content.

The online system 120 and client devices 115 shown in FIG. 1 represent computing devices. A computing device can be a conventional computer system executing, for example, a Microsoft™ Windows™-compatible operating system (OS), Apple™ OS X, and/or a Linux OS. A computing device can also be a device such as a personal digital assistant (PDA), mobile telephone, video game system, etc.

The client devices 115 may interact with the multi-tenant system 120 via a network (not shown in FIG. 1). The network uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

System Architecture

Figure 2:
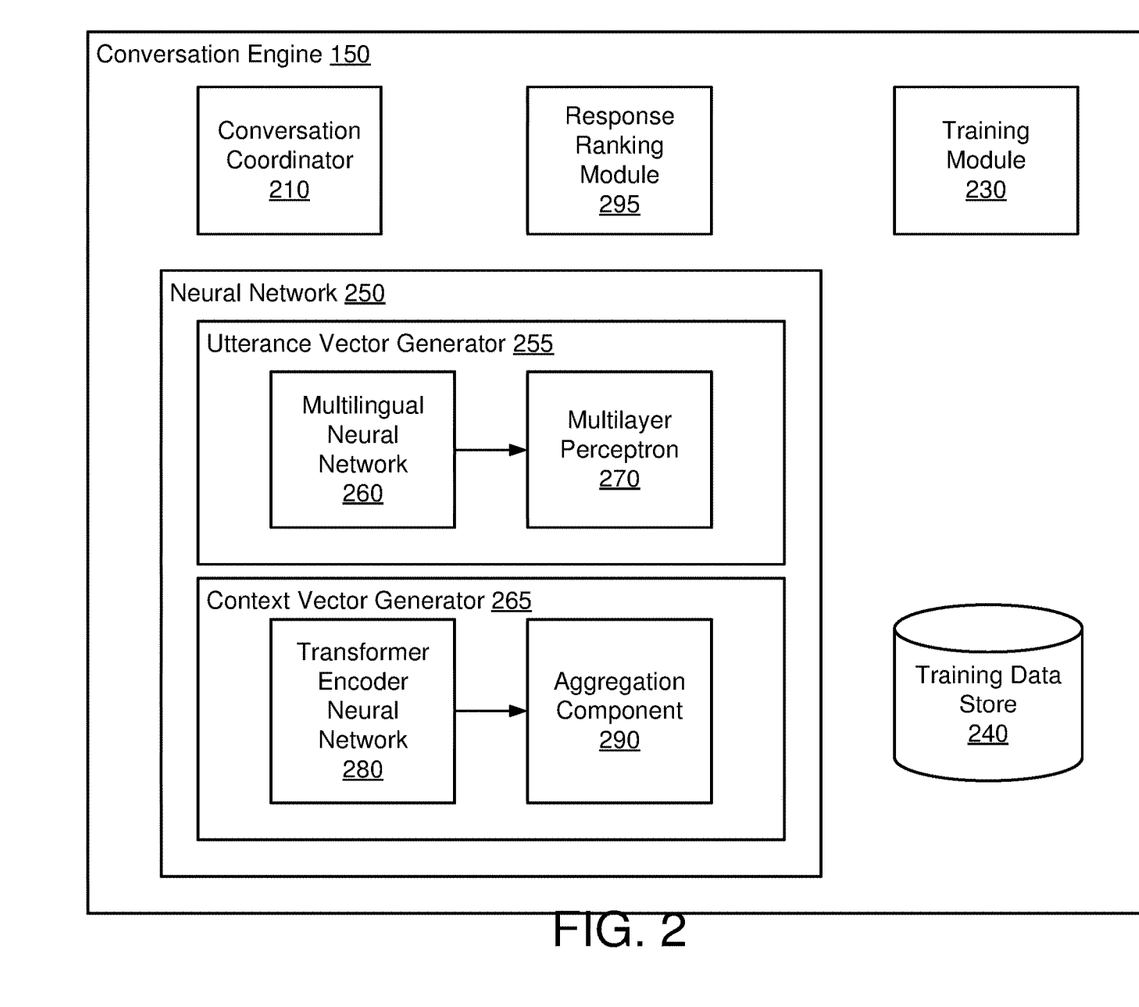
FIG. 2 is a block diagram illustrating components of a conversation engine, according to one embodiment.

FIG. 2 is a block diagram illustrating components of a conversation engine, according to one embodiment. The conversation engine 150 comprises a conversation coordinator 210, a training module 230, a neural network 250, a training data store 240, and a response ranking module 295. Other embodiments can have different and/or other components than the ones described here, and that the functionalities can be distributed among the components in a different manner.

The conversation coordinator 210 coordinates a conversation with the user by managing the flow of the conversation and invokes various components. For example, the conversation coordinator 210 receives user utterances, invokes the neural network 250 to recommend one or more responses for the user. The conversation coordinator 210 identifies a context for the conversation based on the recent set of utterances between the user and the agent. The conversation coordinator 210 uses the context and the candidate responses to determine scores for the candidate responses for ranking the candidate responses. The conversation coordinator 210 may present the ranked responses to an agent that selects one of the candidate responses for providing as a response via the conversation engine. The agent may be a human for example, a representative of an organization or a software module or a process that makes a selection automatically without user involvement.

The conversation coordinator 210 accesses one or more responses for providing to the user via the conversation engine. The responses may be determined based on the conversation with the user. In an embodiment, the online system stores a list of previously prepared candidate responses for use during conversation. The list may be prepared by (1) automated common response mining from historical chat data for a tenant or (2) manually created and added by tenants (e.g., by a system administrator or agent). For example, the conversation coordinator 210 may analyze an utterance received from the user to determine that the user may be interested in certain kind of information. The conversation coordinator 210 may invoke one or more software modules of the online system to retrieve the information that the user is requesting. The conversation coordinator 210 determines a response based on the received information. The conversation coordinator 210 may determine that to retrieve the requested information, the conversation engine needs to request further information from the user and accordingly provides sentences requesting the information from the user. The conversation coordinator 210 may select a response that requests the user to repeat some information if the utterance is not clear, for example, if the utterance if received as an audio signal.

Figure 3:
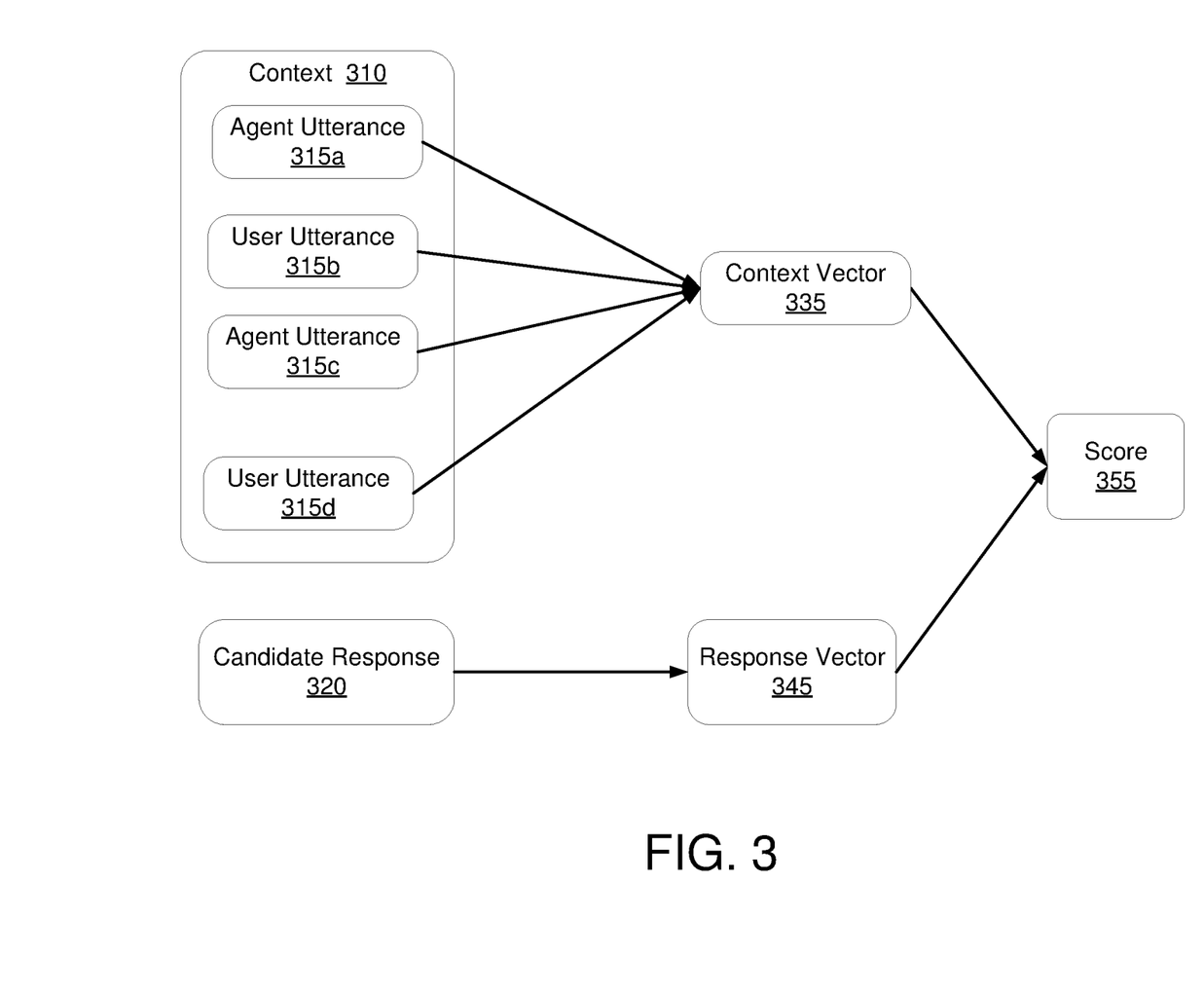
FIG. 3 illustrates the overall flow for ranking candidate responses for a given context of conversation, according to an embodiment.
Figure 5:
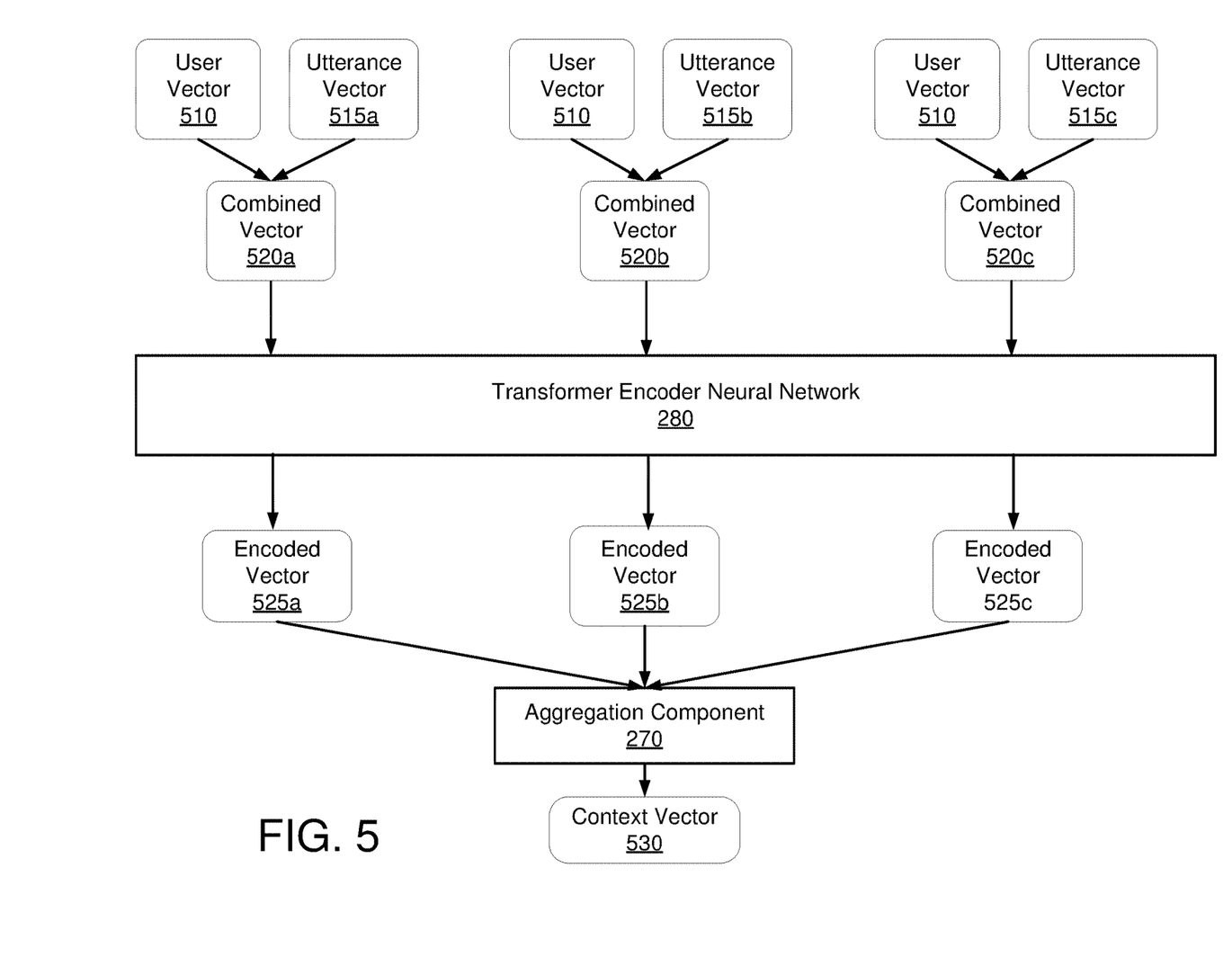
FIG. 5 illustrates generation of a context vector for a sequence of utterances according to an embodiment.

The neural network 250 comprises an utterance vector generator 255 and a context vector generator 265. The utterance vector generator 255 comprises a multilingual neural network 260 and a multilayer perceptron 270. The multilingual neural network 260 is a pretrained model that is trained to receive sentences or phrases in various languages and generate a vector representation of the input sentence or phrase. For a multi-tenant system, the multilingual neural network 260 is trained using data that is independent of any particular tenant. For example, the multilingual neural network 260 may have been trained using publicly available data. The multilayer perceptron 270 includes a plurality of neural network layers. The processing performed by the utterance vector generator 255 is illustrated in FIG. 3. The context vector generator 265 includes a transformer encoder neural network 280 and an aggregation component 290. The transformer encoder neural network 280 takes a sequence of input vectors representing a sequence of user/agent utterances and generates a sequence of encoded vectors.

In an embodiment, the input provided to the transformer encoder neural network 280 is obtained by combining a user vector with an utterance vector, for example, by performing vector addition of the user vector and the utterance vector. The transformer encoder neural network 280 generates encoded vectors for a sequence of combined user vectors and utterance vectors. The aggregation component 290 takes a plurality of encoded vectors as input and aggregates them to generate an aggregate vector which is used as the context vector. For example, the aggregation component 290 may take a plurality of encoded vectors as input and aggregate them by computing the mean of corresponding elements and providing the mean as an element of the output vector. The processing of data by the context vector generator 265 is illustrated in FIG. 5.

The training module 230 trains the neural network 250 using the data stored in the training data store 240. The training module 230 trains the various components of the neural network 250 together using the training data stored in the training data store 240. For example, the weights of various components are all adjusted to reduce a loss value obtained by comparing a predicted output with labeled output of the training data. Although the multilingual neural network 260 is pretrained, the training module 230 may further adjust weights of the multilingual neural network 260 during training.

The training data stores 240 stores training data that acts as positive samples as well as negative samples. The training module 230 uses actual responses that were previously used during a conversation as positive samples and random responses that were obtained from other conversations or from a different turn of a same conversation as negative samples. The training module 230 adjusts the weights of the neural network 250 to maximize a vector product of a context vector and an actual response vector pair and minimize a vector product of a context vector and a random response vector pair.

The response ranking module 295 receives a set of responses and a context and ranks the responses. The response ranking module 295 generates a context vector representation based on the context and a vector representation of the candidate responses. The response ranking module 295 determines a distance score for each of the candidate responses based on the context. The distance score represents a measure of vector distance between a vector representation of a candidate response and the context vector, for example, a vector product or dot product of the two input vectors. The response ranking module 295 ranks the candidate responses based on their distance scores. The response ranking module 295 ranks candidate responses having less distance from the context vector higher.

Processes

FIG. 3 illustrates the overall flow for ranking candidate responses for a given context of conversation, according to an embodiment. Other embodiments can perform the operations of FIG. 3 in different orders. Other embodiments can include different and/or additional steps than the ones described herein.

A context 310 represents a set of utterances that form part of the online conversation. These utterances form a sequence of consecutive utterances that are exchanged between a user and the online system 120. The online system 120 is represented by an agent that may be a user or a software module that approves a candidate response and provides to the user. The utterances by the user are referred to as user utterances, for example, 315b and 315d and the utterances by the agent are referred to as the agent utterances, for example, utterances 315a and 315c. A context vector 335 is generated by combining the utterances 315. The online system 120 identifies one or more candidate responses 320. A response vector 355 is obtained from a candidate response 320. The size of the response vector matches the size of the context vector since they represent vectors in the same multidimensional space. The system determines a score 355 by combining the context vector 335 with the response vector 345. In an embodiment, the score 355 is a measure of distance between the context vector 335 with the response vector 345 in the multi-dimensional space. For example, the score 355 may be determined as a dot product of the context vector 335 with the response vector 345 in the multi-dimensional space, i.e., by computing the sum of the products of corresponding elements of the two vectors.

Figure 4:
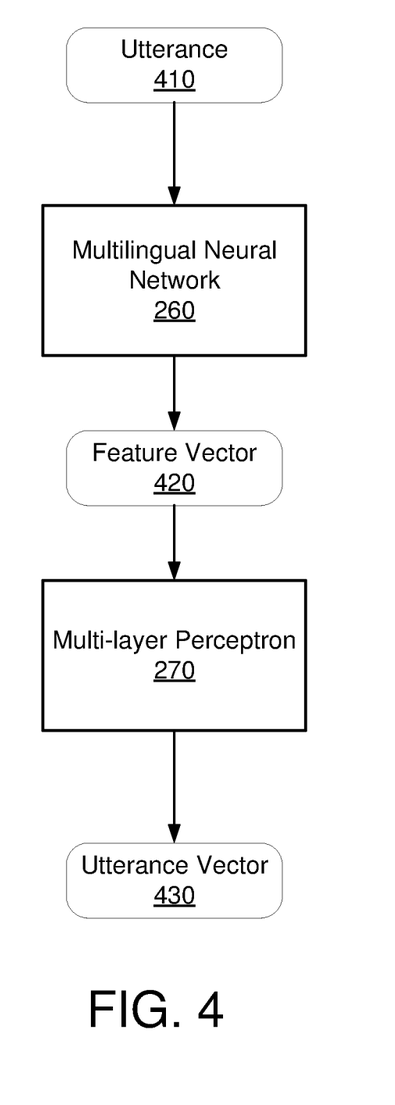
FIG. 4 illustrates generation of a vector representing an utterance of the conversation according to an embodiment.

FIG. 4 illustrates generation of a vector representing an utterance of the conversation according to an embodiment. Other embodiments can perform the steps of FIG. 4 in different orders. Other embodiments can include different and/or additional steps than the ones described herein.

An utterance 410, for example, an agent/user utterance 315 or a candidate response 320 is provided as input to the multi-lingual neural network 260. The multi-lingual neural network component 260 generates a feature vector based on the input utterance 410. The feature vector 420 is provided as input to the multi-layer perceptron 270. The multi-layer perceptron 270 generates an utterance vector 430 that represents the input utterance in a multi-dimensional space. The input utterance may be in any language supported by the multi-lingual neural network 260. The utterance vector 430 is represented using a language independent format.

FIG. 5 illustrates generation of a context vector for a sequence of utterances according to an embodiment. The conversation engine 250 identifies a sequence of utterances 515a, 515b, 515c, that form a context in a conversation. The context is formed by consecutive utterances that may have been provided by the user or generated by the system. For example, the utterances may be user or agent utterances 315 as shown in FIG. 3. The conversation engine 250 generates a vector representation of the user, shown as user vector 510a. In an embodiment, the user vector is formed by providing user attributes to a neural network. The user vector 510 has the same size as the utterance vector 515 and both are from the same multi-dimensional space. The conversation engine 250 adds user vector 510 to each utterance vector 515 to generate a combined vector 520. For example, user vector 510 is added to utterance vector 515a to obtain combined vector 520a; user vector 510 is added to utterance vector 515b to obtain combined vector 520b; user vector 510 is added to utterance vector 515c to obtain combined vector 520c, and so on.

The conversation engine 250 provides the combined vectors as input to the transformer encoder neural network 280. The transformer encoder neural network 280 outputs the encoded vectors 525 corresponding to each combined vector 520 received as input. The conversation engine 250 provides the encoded vectors 525 as input to the aggregation component 270 to combine and generate the context vector 530. In an embodiment, the aggregation component 270 combines the encoded vectors by determining a mean value for corresponding elements of the input vectors and using the mean value as the corresponding element of the context vector 530. In other embodiments, the aggregation component 270 combines the encoded vectors by determining some other aggregate function for corresponding elements, for example, the minimum value, the maximum value, and so on.

Figure 6:
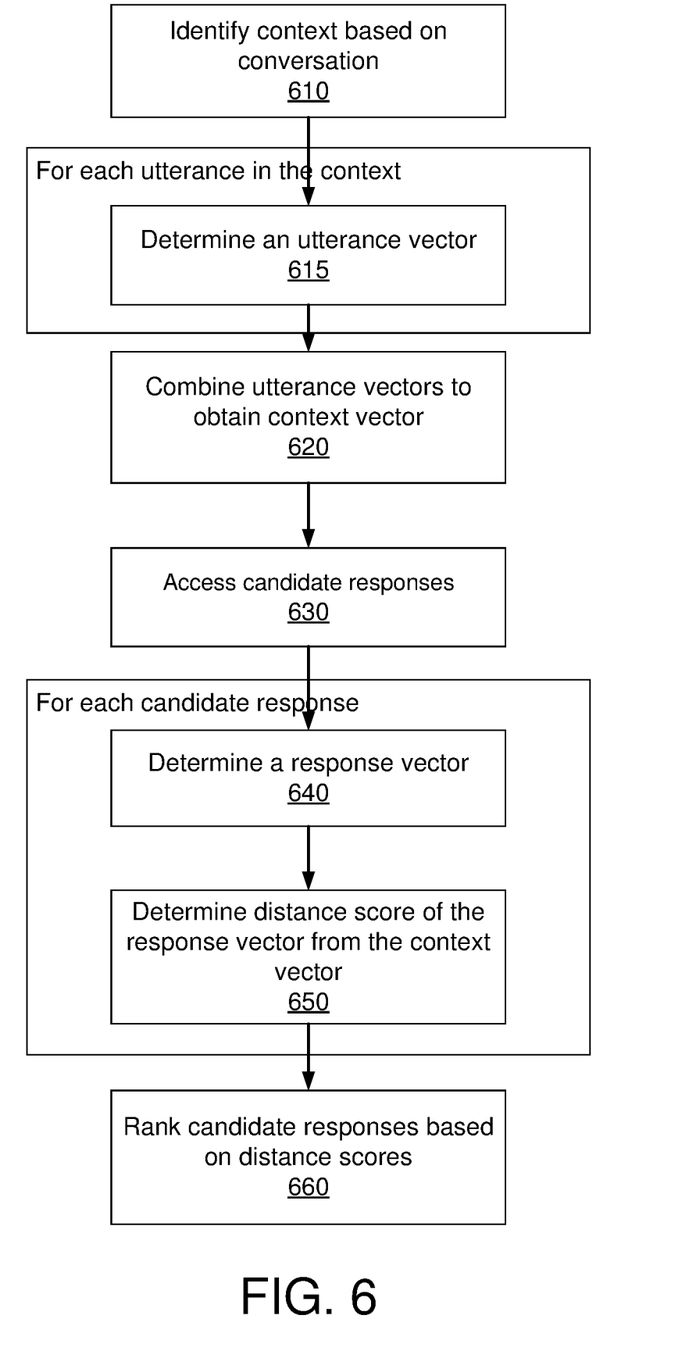
FIG. 6 is a flowchart illustrating the process of ranking candidate responses according to an embodiment.

FIG. 6 is a flowchart illustrating the process of ranking candidate responses according to an embodiment. The conversation engine 250 identifies 610 the context based on a conversation. The context may represent a sequence of the recent most utterances in the conversation.

For each utterance in the context, the conversation engine 250 generates 615 an utterance vector by processing the utterance as shown in FIG. 4. The conversation engine 250 combines 620 the utterance vectors to generate a context vector as shown in FIG. 5.

The conversation engine 250 obtains 630 one or more candidate responses for the given context. The conversation engine 250 repeats steps 640 and 650 for each candidate response. The conversation engine 250 determines 640 a response vector by processing the response as an utterance as shown in FIG. 4. The conversation engine 250 determines 650 a distance score for the response vector from the context vector. The distance score between two vectors may be determined as the dot product of the two vectors, i.e., the sum of the products of corresponding vector elements.

The conversation engine 250 ranks the candidate responses based on the distance scores. In an embodiment, the candidate responses that have less distance score from the context are ranked higher than candidate responses that have higher distance score. Accordingly, a candidate response having a closer match to the context vector is ranked higher.

The conversation engine 250 selects a candidate response based on the ranking. For example, the conversation engine 250 may send the ranked list of candidate responses to an agent and receive a selection of a candidate response from the ranked list. The conversation engine 250 sends the received selection of the candidate responses to the user via the conversation engine. Alternatively, the conversation engine 250 automatically selects the highest ranking response and send it to the user via the conversation engine.

The process shown in FIG. 6 is repeated, for example, after receiving a new utterance from the user in response to the candidate response provided to the user. The conversation engine 250 builds a new context that includes the new user utterance and repeats the steps shown in FIG. 6.

Technical Improvements

The system according to various embodiments provided support for multiple languages compared to existing systems as a result of using the multi-lingual pretrained component 260 as part of the neural network 250. Training existing machine learning based models to process various language would require large amount of training data for each targeted language. Use of a pretrained multilingual model provides support for multiple languages.

Furthermore, the use of the multi-lingual pretrained model improves the amount of training that is required for the neural network 250. Accordingly, the amount of training required is less compared to conventional machine learning techniques to achieve comparable accuracy. As a result, embodiments improve the computational efficiency of training of the neural network 250. On an example run, the training time per epoch was determined to improve approximately 30% compared to a similar machine learning based model.

Furthermore, the neural network 250 has higher accuracy of prediction compared to existing machine learning techniques. Over a set of benchmarks used to measure performance, an improvement of 3-6% was observed in recall. Accordingly, the embodiments provide improved accuracy compared to existing neural network architectures for ranking responses in a conversation.

Computer Architecture

Figure 7:
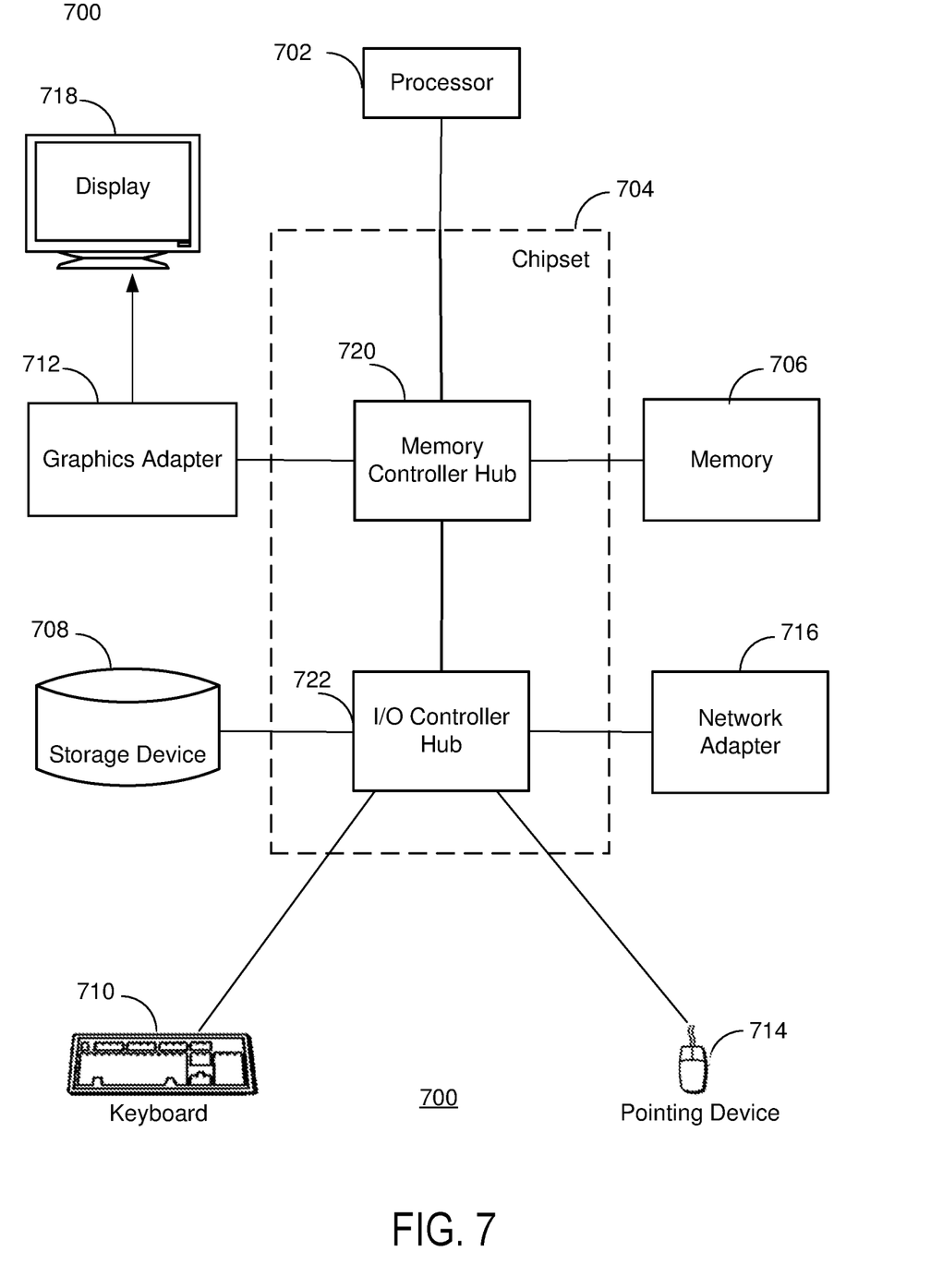
FIG. 7 is a block diagram illustrating a functional view of a typical computer system according to one embodiment.

FIG. 7 is a high-level block diagram illustrating a functional view of a typical computer system for use as one of the entities illustrated in the environment 100 of FIG. 1 according to an embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is a non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer system 700. The graphics adapter 712 displays images and other information on the display 718. The network adapter 716 couples the computer system 700 to a network.

As is known in the art, a computer 700 can have different and/or other components than those shown in FIG. 7. In addition, the computer 700 can lack certain illustrated components. For example, a computer system 700 acting as a multi-tenant system 120 may lack a keyboard 710 and a pointing device 714. Moreover, the storage device 708 can be local and/or remote from the computer 700 (such as embodied within a storage area network (SAN)).

The computer 700 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 708, loaded into the memory 706, and executed by the processor 702.

The types of computer systems 700 used by the entities of FIG. 1 can vary depending upon the embodiment and the processing power used by the entity. For example, a client device 115 may be a mobile phone with limited processing power, a small display 718, and may lack a pointing device 714. The multi-tenant system 120, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer-implemented method, comprising:
receiving a sequence of utterances representing a context in an online conversation, the sequence comprising one or more utterances;
generating a context vector by:
generating one or more utterance vectors by providing the one or more utterances to an utterance vector generator comprising a multilingual neural network;
generating one or more encoded utterance vectors comprising, for each of the one or more utterance vector: adding a user embedding of the user performing the conversation to the utterance vector to generate a combined vector and providing the combined vector as input to a transformer encoder; and
aggregating the one or more encoded utterance vectors to obtain a context vector;
accessing one or more candidate responses for the online conversation;
determining distance scores for the candidate responses by:
generating a response vector for the candidate response using the utterance vector generator; and
combining the response vector with the context vector to obtain the distance score;
selecting a response based on the distance scores of the candidate responses; and
providing the selected response to the user via the online conversation.

2. The computer-implemented method of claim 1, wherein the multilingual neural network is trained to receive an input utterance in one of a plurality of languages and generate a vector representation of the input utterance.

3. The computer-implemented method of claim 1, wherein the multilingual neural network is based on a convolutional neural network.

4. The computer-implemented method of claim 1, wherein the online conversation is performed by a computing system of a multi-tenant system, wherein the multilingual neural network is pretrained using a training dataset independent of tenants of the multi-tenant system the method comprising:
training the multilingual neural network using a training dataset specific to a tenant of the multi-tenant system.

5. The computer-implemented method of claim 1, wherein combining a response vector with the context vector to generate a score comprises determining a dot product of the response vector and the context vector.

6. The computer-implemented method of claim 1, wherein combining a plurality of encoded utterance vectors to obtain a context vector comprises performing a mean pooling of the encoded utterance vectors.

7. The computer-implemented method of claim 1, wherein the utterance vector generator and the transformer encoder neural network are trained to:
maximize a vector product of a context vector and an actual response vector pair; and
minimize a vector product of a context vector and a random response vector pair.

8. A non-transitory computer readable storage medium storing instructions that when executed by a computer processor, cause the computer processor to perform steps comprising:
receiving a sequence of utterances representing a context in an online conversation, the sequence comprising one or more utterances;
generating a context vector by:
generating one or more utterance vectors by providing the one or more utterances to an utterance vector generator comprising a multilingual neural network;
generating one or more encoded utterance vectors comprising, for each of the one or more utterance vector: adding a user embedding of the user performing the conversation to the utterance vector to generate a combined vector and providing the combined vector as input to a transformer encoder; and
aggregating the one or more encoded utterance vectors to obtain a context vector;
accessing one or more candidate responses for the online conversation;
determining distance scores for the candidate responses by:
generating a response vector for the candidate response using the utterance vector generator; and
combining the response vector with the context vector to obtain the distance score;
selecting a response based on the distance scores of the candidate responses; and
providing the selected response to the user via the online conversation.

9. The non-transitory computer readable storage medium of claim 8, wherein the multilingual neural network is trained to receive an input utterance in one of a plurality of languages and generate a vector representation of the input utterance.

10. The non-transitory computer readable storage medium of claim 8, wherein the multilingual neural network is based on a convolutional neural network.

11. The non-transitory computer readable storage medium of claim 8, wherein the online conversation is performed by a computing system of a multi-tenant system, wherein the multilingual neural network is pretrained using a training dataset independent of tenants of the multi-tenant system the instructions further causing the computer processor to perform steps comprising:
training the multilingual neural network using a training dataset specific to a tenant of the multi-tenant system.

12. The non-transitory computer readable storage medium of claim 8, wherein combining a response vector with the context vector to generate a score comprises determining a dot product of the response vector and the context vector.

13. The non-transitory computer readable storage medium of claim 8, wherein combining a plurality of encoded utterance vectors to obtain a context vector comprises performing a mean pooling of the encoded utterance vectors.

14. The non-transitory computer readable storage medium of claim 8, wherein the utterance vector generator and the transformer encoder neural network are trained to:
maximize a vector product of a context vector and an actual response vector pair; and
minimize a vector product of a context vector and a random response vector pair.

15. A computer system comprising:
a computer processor; and
a non-transitory computer readable storage medium storing instructions that when executed by the computer processor cause the computer processor to perform steps for enabling custom configuration of a tenant-specific conversation engine to process and act upon natural language requests without requiring tenant-specific training, the steps comprising:
receiving a sequence of utterances representing a context in an online conversation, the sequence comprising one or more utterances;
generating a context vector by:
generating one or more utterance vectors by providing the one or more utterances to an utterance vector generator comprising a multilingual neural network;
generating one or more encoded utterance vectors comprising, for each of the one or more utterance vector: adding a user embedding of the user performing the conversation to the utterance vector to generate a combined vector and providing the combined vector as input to a transformer encoder; and
aggregating the one or more encoded utterance vectors to obtain a context vector;
accessing one or more candidate responses for the online conversation;
determining distance scores for the candidate responses by:
generating a response vector for the candidate response using the utterance vector generator; and
combining the response vector with the context vector to obtain the distance score;
selecting a response based on the distance scores of the candidate responses; and
providing the selected response to the user via the online conversation.

16. The computer system of claim 15, wherein the online conversation is performed by a computing system of a multi-tenant system, wherein the multilingual neural network is pretrained using a training dataset independent of tenants of the multi-tenant system the instructions further causing the computer processor to perform steps comprising:
training the multilingual neural network using a training dataset specific to a tenant of the multi-tenant system.

17. The computer system of claim 15, wherein the utterance vector generator and the transformer encoder neural network are trained to:
maximize a vector product of a context vector and an actual response vector pair; and
minimize a vector product of a context vector and a random response vector pair.

18. The computer system of claim 15, wherein the multilingual neural network is trained to receive an input utterance in one of a plurality of languages and generate a vector representation of the input utterance.

19. The computer system of claim 15, wherein combining a response vector with the context vector to generate a score comprises determining a dot product of the response vector and the context vector.

20. The computer system of claim 15, wherein combining a plurality of encoded utterance vectors to obtain a context vector comprises performing a mean pooling of the encoded utterance vectors.

* * * * *